US008253907B2

(12) United States Patent
Park et al.

(10) Patent No.: US 8,253,907 B2
(45) Date of Patent: Aug. 28, 2012

(54) LIQUID CRYSTAL DISPLAY DEVICE AND METHOD FOR FABRICATING THE SAME

(75) Inventors: Dong-seok Park, Yanggi-ri (KR); Jae Seok Park, Daegu (KR); Hwi-Deuk Lee, Chilgok-gun (KR)

(73) Assignee: LG Display Co., Ltd., Seoul (KR)

( * ) Notice: Subject to any disclaimer, the term of this patent is extended or adjusted under 35 U.S.C. 154(b) by 342 days.

(21) Appl. No.: 12/618,418

(22) Filed: Nov. 13, 2009

(65) Prior Publication Data

US 2010/0283930 A1 Nov. 11, 2010

(30) Foreign Application Priority Data

May 7, 2009 (KR) .................. 10-2009-0039895

(51) Int. Cl.
*G02F 1/1368* (2006.01)
*G02F 1/1343* (2006.01)
*H01L 21/00* (2006.01)

(52) U.S. Cl. .......... 349/141; 349/43; 349/106; 349/139; 349/187; 438/30

(58) Field of Classification Search .................. 349/42, 349/43, 106, 107, 108, 139, 141, 143, 177, 349/187; 438/30, 151; 257/59, 72; 345/88, 345/92
See application file for complete search history.

(56) References Cited

U.S. PATENT DOCUMENTS

| 2007/0121047 A1* | 5/2007 | Chung et al. | 349/141 |
| 2009/0225106 A1* | 9/2009 | Kim et al. | 345/691 |
| 2010/0128208 A1* | 5/2010 | Kurasawa | 349/106 |
| 2011/0051055 A1* | 3/2011 | Lee et al. | 349/106 |

* cited by examiner

*Primary Examiner* — Dung Nguyen
*Assistant Examiner* — Tai Duong
(74) *Attorney, Agent, or Firm* — Brinks Hofer Gilson & Lione (57) ABSTRACT

A LCD device includes a plurality of color display pixels and a viewing angle control pixel on a first substrate; a backlight shielding pattern formed at a circumferential region of the viewing angle control pixel; a first pixel electrode and a second pixel electrode connected to a drain electrode of a TFT; a protective film formed on a gate line, a data line, the TFT, the first electrode and the second pixel electrode, wherein a first contact hole is formed to expose part of the backlight shielding pattern; a first common electrode connected to the backlight shielding pattern through the first contact hole of the protective film, which is formed to be overlapped with at least part of the first pixel electrode, part of the TFT, and part of the backlight shielding pattern, wherein a plurality of slits overlapped with the first pixel electrode are formed; and a second common electrode formed by corresponding to the first pixel electrode on a second substrate.

13 Claims, 5 Drawing Sheets

LIQUID CRYSTAL DISPLAY DEVICE AND METHOD FOR FABRICATING THE SAME

This application claims the benefit of Korea Patent Application No. 10-2009-0039895, filed on May 7, 2009, the entire contents of which is incorporated herein by reference for all purposes as if fully set forth herein.

BACKGROUND

1. Field of the Invention

The present disclosure relates to a liquid crystal display device and a method of fabricating the same, and more particularly, to a liquid crystal display device having enhanced transmittance and a method of fabricating the same.

2. Discussion of the Related Art

In general, a liquid crystal display device has characteristics such as light weight, thin profile, low power consumption, and the like, and the application area thereof has been gradually expanded due to such characteristics. Accordingly, liquid crystal display devices are widely used as a means for displaying a screen in a portable computer, a portable phone, office automation equipment, or the like.

Typically, the liquid crystal display device displays desired images on a screen thereof by controlling an amount of the optical transmission based on image signals applied to a plurality of control switching elements arranged in a matrix form.

The liquid crystal display device is configured by including a liquid crystal panel in which a color filter substrate that is an upper substrate and a thin-film transistor array substrate that is a lower substrate are disposed to face to each other and a liquid crystal layer is formed between the two substrates, and a driving unit for operating the liquid crystal panel by supplying scan signals and image information to the liquid crystal panel.

The liquid crystal display devices having such a configuration are divided into a vertical electric field application type and a horizontal electric field application type according to the direction of an electric field driving the liquid crystals.

The vertical electric field application type liquid crystal device includes a thin-film transistor array substrate and a color filter substrate facing to each other in which a plurality of pixels are defined, a liquid crystal layer formed between the thin-film transistor array substrate and the color filter substrate, a pixel electrode formed for each pixel that is defined on the thin-film transistor array substrate, and a common electrode formed on the color filter substrate, and therefore, the vertical electric field application type liquid crystal device having such a configuration drives liquid crystals in the liquid crystal layer by vertical electric field formed between the pixel electrode and the common electrode. As an example, there are a twisted nematic (TN) mode liquid crystal display device and an electrically controlled birefringence mode liquid crystal display device.

The horizontal electric field application type liquid crystal device includes a thin-film transistor array substrate and a color filter substrate facing to each other in which a plurality of pixels are defined, a liquid crystal layer formed between the thin-film transistor array substrate and the color filter substrate, and a plurality of pixel electrodes and common electrodes alternatively formed substantially in parallel for each pixel that is defined on the thin-film transistor array substrate, and therefore, the horizontal electric field application type liquid crystal device having such a configuration drives liquid crystals in the liquid crystal layer by horizontal electric field formed between the pixel electrode and the common electrode. As an example, there is an in-plane switching (IPS) mode liquid crystal display device.

Among such various liquid crystal display devices, the IPS mode liquid crystal display device has an advantage of wide viewing angle due to a small birefringence change to the direction of viewing angle, and in recent years, the trend of employing the IPS mode liquid crystal display device continues to increase.

However, the advantage of wide viewing angle in the IPS mode liquid crystal display device also creates an adverse effect such as a danger of violating the user's privacy by neighboring persons close to a liquid crystal display device in use when using a computer for his or her personal purposes, leaking confidential information when carrying out his or her duties including confidential matters, or the like.

In order to solve such confidential problems, a liquid crystal display device has been proposed in which a viewing angle control sub-pixel for selectively implementing an ECB mode or an off mode is further provided in addition to red, green, and blue sub-pixels.

Hereinafter, a liquid crystal display device having such a viewing angle control sub-pixel will be described in brief with reference to FIG. 1.

Figure 1:
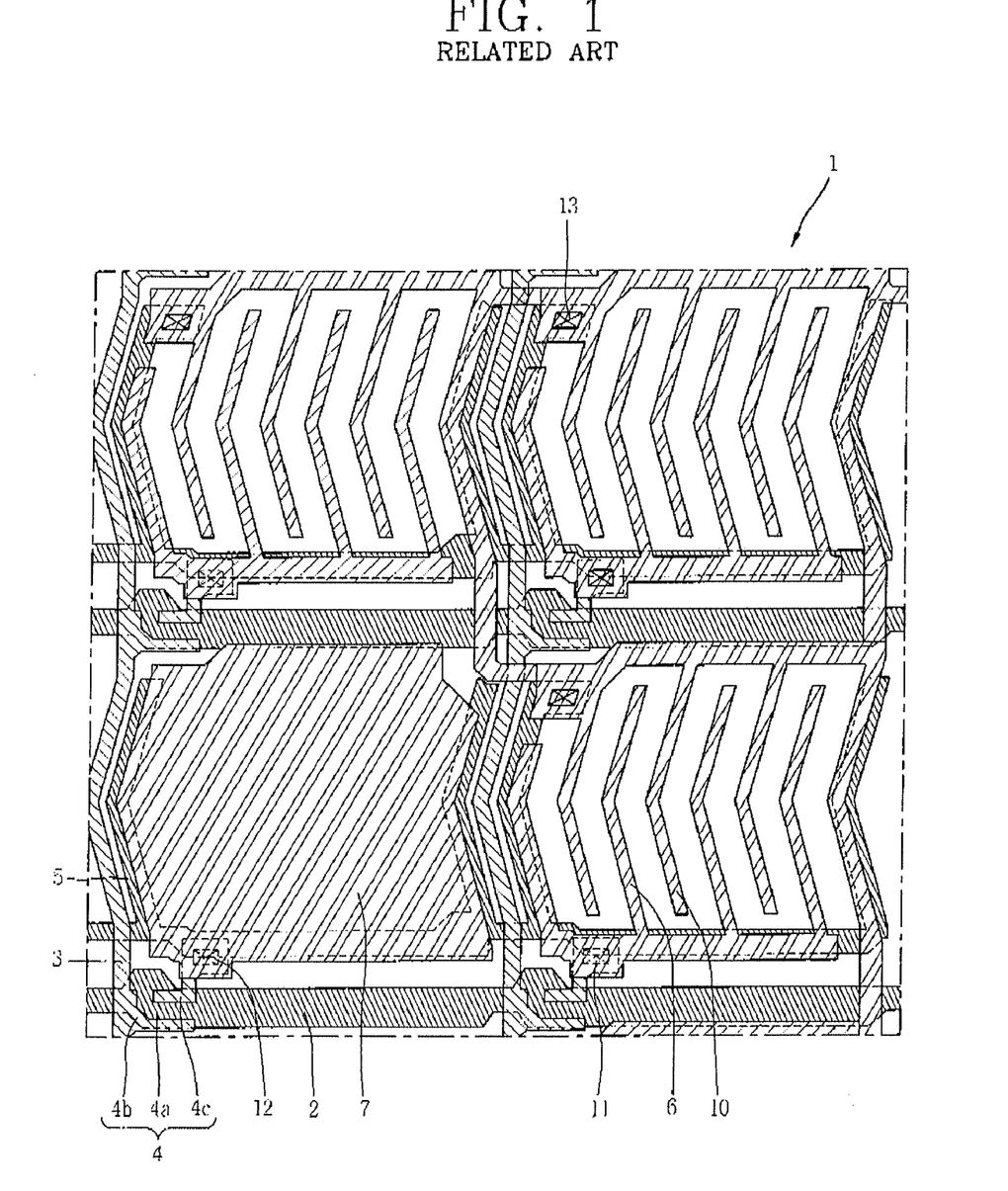
FIG. 1 is a plan view illustrating a typical liquid crystal display device in the related art.

As illustrated in FIG. 1, a liquid crystal display device in the related art is configured by including a first substrate 1 and a second substrate (not shown); a gate line 2 and a data line 3 formed to intersect vertically and horizontally with each other on the first substrate 1 for defining red, green, and blue pixels and a viewing angle control pixel; a backlight shielding pattern (BLSP) 5 formed at a circumference of the red, green, and blue pixels and the viewing angle control pixel; a thin-film transistor 4 having a gate electrode 4a, a source electrode 4b, and a drain electrode 4c, which is formed at each region intersected by the gate line 2 and the data line 3 on the first substrate 1; a plurality of first pixel electrodes 6 and first common electrodes 10 alternatively formed to be apart from each other by a predetermined distance at the red, green, and blue pixels on the first substrate 1; a second pixel electrode 7 formed at the viewing angle control pixel on the first substrate 1; and a second common electrode (not shown) formed to correspond to the second pixel electrode 7 on the second substrate.

Furthermore, a gate insulation film (not shown) is formed on the gate line 2, the gate electrode 4a of the thin-film transistor 4, and the backlight shielding pattern 5, a protective film (not shown) is formed on the data line 3, and the source electrode 4b and drain electrode 4c of the thin-film transistor 4, and a first contact hole 11 and a second contact hole 13 for exposing part of the drain electrode 4c of the thin-film transistor 4 and the backlight shielding pattern 5, respectively, which are formed at the red, green, and blue pixels and the viewing angle control pixel, are formed on the gate insulation film and protective film, wherein the drain electrode 4c of the thin-film transistor 4 is connected to the first pixel electrode 6 through the first contact hole 11 for the red, green, and blue pixels, the drain electrode 4c of the thin-film transistor 4 is connected to the second pixel electrode 7 by the first contact hole 11 for the viewing angle control pixel, and the backlight shielding pattern 5 of the red, green, and blue pixels is connected to the first common electrode 10 by the second contact hole 13. Furthermore, all the backlight shielding patterns 5 formed at the red, green, and blue pixels and the viewing angle control pixel are connected to one another to form an integrated body.

The liquid crystal display device having such a configuration in the related art may be driven by selecting a narrow viewing angle mode or a wide viewing angle mode.

More specifically, when driven in the wide viewing angle mode, the red, green, and blue pixels are driven, but the viewing angle control pixel is not driven, thereby forming horizontal electric fields between the first pixel electrodes 6 and the first common electrodes 10 in the liquid crystal layer corresponding to the red, green, and blue pixels. In this manner, it may be similarly driven as an IPS mode liquid crystal display device when the red, green, and blue pixels are driven but the viewing angle control pixel is not driven, thereby implementing a wide viewing angle.

In addition, when driven in the narrow viewing angle mode, the red, green, and blue pixels and the viewing angle control pixel are all driven, thereby forming horizontal electric fields between the first pixel electrodes 6 and the first common electrodes 10 in the liquid crystal layer corresponding to the red, green, and blue pixels, and forming vertical electric fields between the second pixel electrodes 7 and the second common electrodes (not shown) in the liquid crystal layer of the viewing angle control pixels. As a result, light is leaked in the direction of an inclined (lateral) viewing angle, thereby implementing a narrow viewing angle in which viewing of a screen cannot be facilitated.

Nevertheless, a liquid crystal display device according to the related art, as described above, has a disadvantage of low transmittance because the number of viewing angle control pixels, which are used only for controlling a viewing angle but not used for displaying colors, occupies a quarter of the total number of pixels, and therefore, studies for enhancing the transmittance thereof are actively carried out. In particular, according to the liquid crystal display device in the related art, as described above, electric fields are not formed on part or all of the first pixel electrodes 6 and the first common electrodes 10 of the red, green, and blue pixels, thereby causing a main reason for reducing the transmittance thereof. Moreover, according to the liquid crystal display device in the related art, as described above, two contact holes (first and second contact holes) should be necessarily formed for each of the red, green, and blue pixels, and one contact hole (second contact hole) should be necessarily formed for each viewing angle control pixel, thereby causing a reason for reducing the transmittance thereof because of the area occupied by the contact holes within a pixel.

BRIEF SUMMARY

A liquid crystal display device includes a first substrate and a second substrate; a gate line and a data line formed to intersect vertically and horizontally with each other on the first substrate for defining a plurality of color display pixels and a viewing angle control pixel; a thin-film transistor having a gate electrode, a source electrode, and a drain electrode, which is formed at each region intersected by the gate line and the data line on the first substrate; a backlight shielding pattern formed at a circumferential region of the viewing angle control pixel on the first substrate; a first pixel electrode connected to the drain electrode of the thin-film transistor, which is formed at the color display pixels on the first substrate; a second pixel electrode connected to the drain electrode of the thin-film transistor, which is formed at the viewing angle control pixel on the first substrate; a protective film formed on the gate line, the data line, the thin-film transistor, the first electrode, and the second pixel electrode, wherein a first contact hole is formed to expose part of the backlight shielding pattern; a first common electrode connected to the backlight shielding pattern through the first contact hole of the protective film, which is formed to be overlapped with at least part of the first pixel electrode, part of the thin-film transistor, and part of the backlight shielding pattern, wherein a plurality of slits overlapped with the first pixel electrode are formed; and a second common electrode formed by corresponding to the first pixel electrode on the second substrate.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Hereinafter, a liquid crystal display device and a method of fabricating the same according to a preferred embodiment of the present invention will be described in detail with reference to the accompanying drawings.

<Configuration of the Present Invention>

First, referring to FIGS. 2 and 3, a liquid crystal display device according to a preferred embodiment of the present invention will be described as follows.

Figure 2:
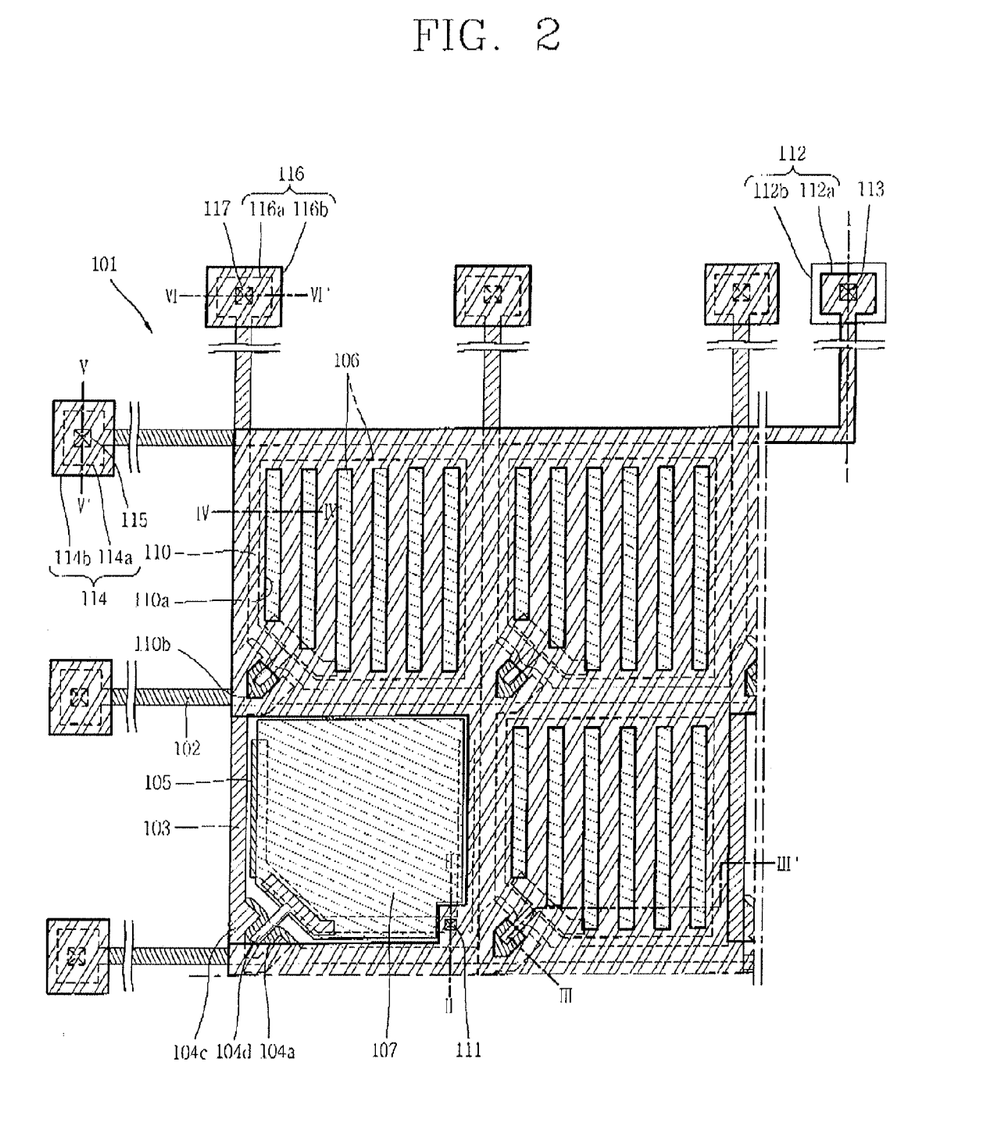
FIG. 2 is a plan view illustrating a liquid crystal display device according to a preferred embodiment of the present invention.
Figure 3:
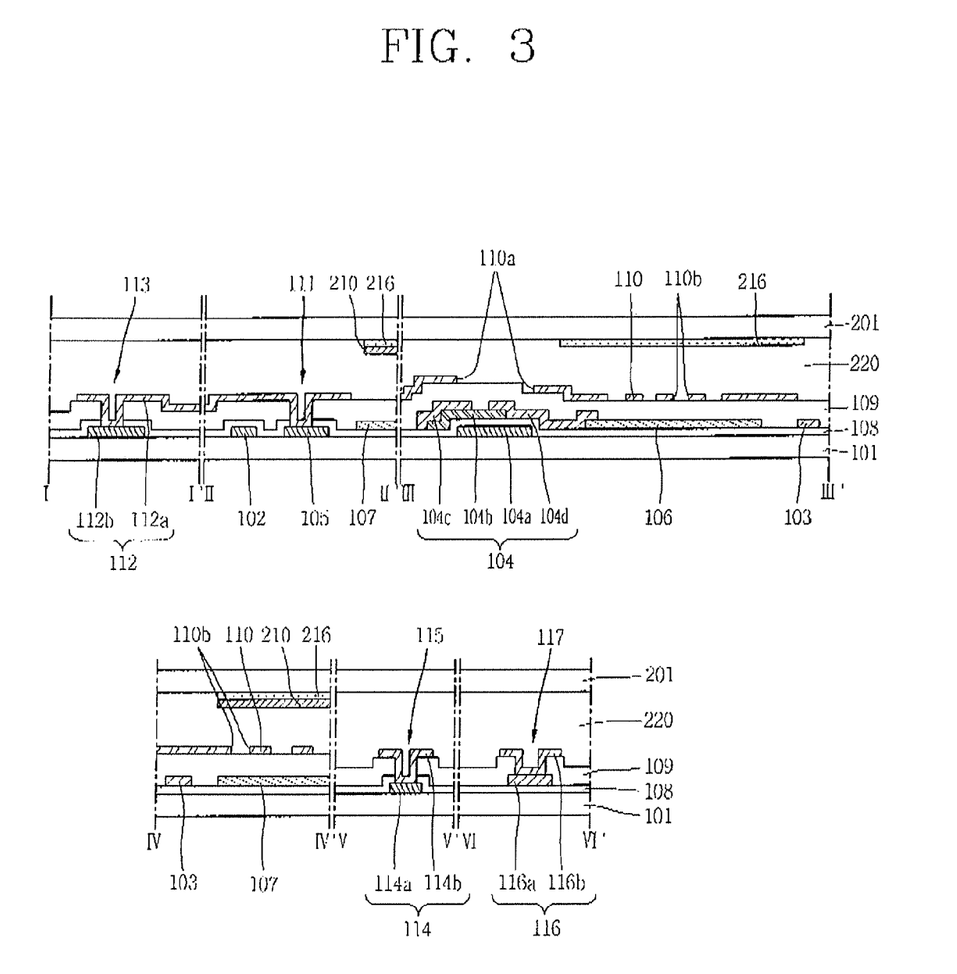
FIG. 3 is a cross-sectional view illustrating the cross sections cut along lines I-I', II-II', IV-IV', V-V', and VI-VI' of FIG. 2.

As illustrated in FIGS. 2 and 3, a liquid crystal display device according to a preferred embodiment of the present invention is configured by including a first substrate 101 and a second substrate 201; a gate line 102 and a data line 103 formed to intersect vertically and horizontally with each other on the first substrate 101 for defining a plurality of color display pixels and a viewing angle control pixel; a thin-film transistor 104 having a gate electrode 104a, a source electrode 104c, and a drain electrode 104d, which is formed at each region intersected by the gate line 102 and the data line 103 on the first substrate 101; a backlight shielding pattern (BLSP) 105 formed at a circumferential region of the viewing angle control pixel on the first substrate 101; a first pixel electrode 106 connected to the drain electrode 104d of the thin-film transistor 104, which is formed at the color display pixels on the first substrate 101; a second pixel electrode 107 connected to the drain electrode 104d of the thin-film transistor 104, which is formed at the viewing angle control pixel on the first substrate 101; a protective film 109 formed on the gate line 102, the data line 103, the thin-film transistor 104, the first electrode 106, and the second pixel electrode 107, wherein a first contact hole 111 is formed to expose part of the backlight shielding pattern 105; a first common electrode 110 connected to the backlight shielding pattern 105 through the first contact hole 111 of the protective film, which is formed to be overlapped with at least part of the first pixel electrode 106, part of the thin-film transistor 104, and part of the backlight shielding pattern 105, wherein a plurality of slits 110a overlapped with the first pixel electrode 106 are formed;

and a second common electrode (not shown) formed by corresponding to the first pixel electrode 106 on the second substrate.

Each element of the liquid crystal display device having such a configuration according to a preferred embodiment of the present invention will be described in detail as follows.

Referring to FIGS. 2 and 3, a liquid crystal display device according to a preferred embodiment of the present invention is provided with a liquid crystal panel including a first substrate 101 that is a thin-film transistor and a second substrate 201 that is a color filter substrate, and a liquid crystal layer 220 is formed between the first substrate 101 and the second substrate 201.

A display region and a pad region are defined on the first substrate 101, and a gate line 102 and a data line 103 are formed in the display region to intersect vertically and horizontally with each other for defining a plurality of color display pixels and a viewing angle control pixel, and a thin-film transistor 104 is formed at each region intersected by the gate line 102 and the data line 103 and connected to the gate line 102 and the data line 103.

In describing a liquid crystal display device according to a preferred embodiment of the present invention, a case is taken as an example in which the plurality of color display pixels are red, green, and blue pixels, but the present invention is not limited to this example, and various combinations can be made for the plurality of color display pixels as long as their colors are displayed.

Furthermore, with regard to the four pixels as illustrated in FIG. 2, a case is taken as an example in which two pixels positioned at the top side and one pixel on the right positioned at the bottom side are used for the color display pixels and one pixel on the left positioned at the bottom side is used for the viewing angle control pixel, but the present invention is not limited to this example, and various examples of arranging the color display pixels and the viewing angle control pixel can be made without departing from the gist of the present invention.

A thin-film transistor 104 formed on each of the color display pixels and the viewing angle control pixel is configured by including a gate electrode 102a formed on the first substrate 101, a gate insulation film 108 formed on the gate electrode 102a, a semiconductor layer 102b formed on the gate insulation film 108, a source electrode 104c and a drain electrode 104d formed on the semiconductor layer 102b. For the convenience of explanation, a thin-film transistor 104 without including the semiconductor layer 102b is illustrated in FIG. 2, and a thin-film transistor 104 including the semiconductor layer 102b is illustrated in FIG. 3.

A backlight shielding pattern 105 is formed at a circumferential region of the viewing angle control pixel on the first substrate 101, and the backlight shielding pattern 105 prevents the quality of the display from being degraded by distorting a driving waveform of the liquid crystal layer corresponding to the viewing angle control pixel by a pixel voltage transmitted through the data line 103.

The backlight shielding pattern 105 is formed with the same material and on the same layer as that of the gate line 102 and the gate electrode 104a of the thin-film transistor 104, and the aforementioned gate insulation film 108 is formed on the backlight shielding pattern 105, the gate line 102, and the gate electrode 104a of the thin-film transistor 104.

Referring to the section II'-III' of FIG. 3, for the color display pixel of the first substrate 101, a first pixel electrode 106 directly connected to the drain electrode 104d of the thin-film transistor 104 with no contact hole, which is formed in the relevant pixel, is formed on the gate insulation film 108.

Referring to FIG. 2, for the viewing angle control pixel on the first substrate 101, a second pixel electrode 107 directly connected to the drain electrode 104d of the thin-film transistor 104 with no contact hole, which is formed in the relevant pixel, is formed.

Referring to FIGS. 2 and 3, a protective film 109 is formed on the data line 103, the thin-film transistor 104, the first electrode 106, and the second pixel electrode 107, and a first contact hole 111 is formed on the protective film 109.

Referring to the section II-II' of FIG. 3, the first contact hole 111 is simultaneously formed on the protective film 109 and the gate insulation film 108 to expose part of the backlight shielding pattern 105.

Referring to the sections II'-III' and IV-IV' of FIGS. 2 and 3, a first common electrode 110 provided with a plurality of slits 110a, which are overlapped with the first pixel electrode 106 of the color display pixel and disposed in parallel with the data line 103, is formed on the protective film 109, and the first common electrode 110 in cooperation with the first pixel electrode 106 formed on the color display pixel attached to itself forms a fringe field that is a parabolic-type transversal electric field, thereby driving a liquid crystal layer corresponding to the relevant color display pixel.

A hole 110b of the first common electrode 110 is formed on a region corresponding to a region on which a semiconductor layer 104b of the thin-film transistor 104 formed in the color display pixels is exposed between the source electrode 104c and the drain electrode 104d.

Referring to the section II'-II' of FIG. 3, the first common electrode 110 is formed to be overlapped with a region of the color display pixel excluding the hole 110b, and part of the backlight shielding pattern 105 of the viewing angle control pixel as well as part of the first pixel electrode 106, and the region overlapped with the backlight shielding pattern 105 is connected through a first contact hole 111 formed on the gate insulation film 108 and the protective film 109, thereby allowing the common electrode to apply even to the backlight shielding pattern 105.

Furthermore, the first common electrode 110 is formed to be overlapped with a region, which is not adjacent to the backlight shielding pattern 105 of the viewing angle control pixel on the data line 103, and as a result, the first common electrode 110 prevents the quality of the display from being degraded by distorting a driving waveform of the liquid crystal layer corresponding to the color display pixel by a pixel voltage transmitted through the data line 103.

The first common electrode 110 is preferably formed with a transparent conductive material, such as Indium Tin Oxide (ITO).

A second common electrode 210 corresponding to the first pixel electrode 106 formed at the viewing angle control pixel of the first substrate 101 is formed on the second substrate 201, and the second common electrode 210 in cooperation with the first pixel electrode 106 formed at the viewing angle control pixel of the first substrate 101 forms a vertical electric field, thereby driving a liquid crystal layer corresponding to the relevant viewing angle control pixel.

Furthermore, red, green, and blue color filters 216 formed at the regions corresponding to the color display pixels on the first substrate 101 for displaying colors are formed on the second substrate 201.

According to a liquid crystal display device in accordance with a preferred embodiment of the present invention, a common pad 112, a gate pad 114, and a data pad 116 are formed at a pad region constituting a circumference of the display region of the first substrate 101, and the common pad 112 is connected to the first common electrode 110, and the gate pad 114 is connected to the gate line 102, and the data pad 116 is connected to the data line 103.

Referring to the section I-I' of FIGS. 2 and 3, the common pad 112 is connected to a common power supply unit (not shown) to supply a common voltage to the first common electrode 110, and the common pad 112 is configured by including a common pad upper electrode 112a extended from the first common electrode 110, and a common pad lower electrode 112b connected to the common pad upper electrode 112a through a second contact hole 113 formed on the gate insulation film 108 and the protective film 109.

In addition to the first contact hole 111 formed at the viewing angle control pixel, the second contact hole 113 is also formed on the gate insulation film 108 and the protective film 109, and it will be described in detail in the description of a fabrication method thereof according to the present invention.

In describing a liquid crystal display device according to a preferred embodiment of the present invention, a case is taken as an example in which the common pad is formed at the right side of a group of the data pads 116, but the present invention is not limited to this example, but various examples including a case in which the common pad 112 is formed at the left side of a group of the data pads 116 can be made without departing from the gist of the present invention.

Referring to the section V-V' of FIGS. 2 and 3, the gate pad 114 is connected to a gate driver (not shown) to supply a gate signal to the gate line 102, and the gate pad 114 is configured by including a gate pad lower electrode 114a extended from the gate line 102, and a gate pad upper electrode 114b connected to the gate pad lower electrode 114a through a third contact hole 115 formed on the gate insulation film 108 and the protective film 109 for exposing the gate pad lower electrode 114a. Here, in addition to the first and the second contact holes 111, 113, the third contact hole 115 is also formed on the gate insulation film 108 and the protective film 109.

Referring to the section VI-VI' of FIGS. 2 and 3, the data pad 116 is connected to a data driver (not shown) to supply a pixel voltage to the data line 103, and the data pad 116 is configured by including a data pad lower electrode 116a extended from the data line 103, and a data pad upper electrode 116b connected to the data pad lower electrode 116a through a fourth contact hole 117 formed on the protective film 109 for exposing the data lower electrode 116a.

The second through fourth contact holes 113, 115, 117 are formed in a pad region at an outside of the display region on the first substrate 101, and positioned at an outside of the color display pixels and the viewing angle control pixel, and thus it may not be a factor reducing the transmittance of a liquid crystal display device according to the present invention.

According to a liquid crystal display device having the foregoing configuration in accordance with a preferred embodiment of the present invention, contact holes are not formed at all within the color display pixels, and only one first contact hole 111 is formed in each of the viewing angle control pixels. As a result, the area occupied by contact holes in the color display pixels and the viewing angle control pixel can be minimized, thereby enhancing the transmittance thereof, when compared to the related art.

Furthermore, according to a liquid crystal display device in accordance with a preferred embodiment of the present invention, electric fields are formed on the first common electrode 110 as well as on the first pixel electrode 106 to maximize the electric field forming region, thereby enhancing the transmittance thereof, thereby greatly enhancing the transmittance thereof, when compared to the related art.

According to a liquid crystal display device having the foregoing configuration in accordance with a preferred embodiment of the present invention, it is possible to selectively drive a wide viewing angle mode or a narrow viewing angle mode, and the operation thereof will be described in detail.

First, when driving in the wide viewing angle mode, the thin-film transistor 104 formed in the color display pixel is driven to apply a pixel voltage to the first pixel electrode 106 of the color display pixel but the viewing angle control pixel is not driven, and accordingly a fringe field is formed by a pixel voltage applied to the first pixel electrode 106 and a common voltage applied to the first common electrode 110 in the liquid crystal layer corresponding to the color display pixel, thereby driving the liquid crystal layer corresponding to the relevant color display pixel, and as a result, a wide viewing angle can be implemented.

Furthermore, when driving in the narrow viewing angle mode, the thin-film transistor 104 formed in the color display pixel is driven to apply a pixel voltage to the first pixel electrode 106 of the color display pixel and the thin-film transistor 104 formed in the viewing angle control pixel is driven to apply a drive voltage to the second pixel electrode 107 of the viewing angle control pixel, and accordingly a fringe field is formed by a pixel voltage applied to the first pixel electrode 106 and a common voltage applied to the first common electrode 110 in the liquid crystal layer corresponding to the color display pixel, thereby driving the liquid crystal layer corresponding to the relevant color display pixel to display colors, and a vertical electric field is formed by a driving voltage applied to the second pixel electrode 107 and a common voltage applied to the second common electrode 210 in the liquid crystal layer corresponding to the viewing angle control pixel, thereby driving the liquid crystal layer corresponding to the relevant viewing angle control pixel to display black in the front viewing angle direction, and leak light in the lateral viewing angle direction in order not to facilitate the viewing of a screen, and as a result, a narrow viewing angle can be implemented.

<Fabrication Method of the Present Invention>

Hereinafter, a method of fabricating a liquid crystal display device according to a preferred embodiment of the present invention will be described in detail with reference to FIGS. 4a through 4g.

FIGS. 4a through 4g are cross-sectional views illustrating a method of fabricating a first substrate as illustrated in FIGS. 2 and 3. In each of the drawings, a method of fabricating a common pad 112 is illustrated on the left, a method of fabricating a viewing angle control pixel is illustrated in the middle, and a method of fabricating a color display pixel is illustrated on the right.

Figure 4A:
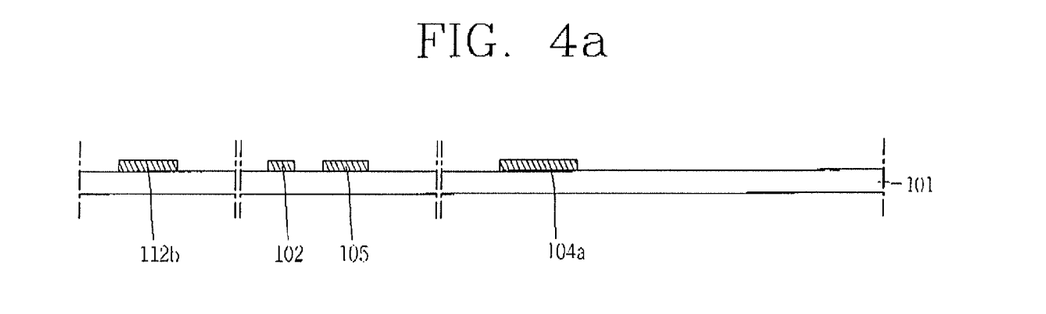
FIGS. 4a through 4g are cross-sectional views illustrating a method of fabricating a liquid crystal display device according to a preferred embodiment of the present invention as illustrated in FIGS. 2 and 3.

First, a first substrate 101 is prepared in which a display region and a pad region are defined and a plurality of color display pixels and a viewing angle control pixel are defined in the display region.

Next, a first photosensitive film pattern is formed by sequentially forming a first conductive material layer and a first photosensitive film on the first substrate 101, and then performing a photolithography process using a first mask. The first conductive material layer is formed of aluminum (Al), aluminum alloy (Al alloy), copper (Cu), chromium (Cr), molybdenum (Mo), or the like.

The first mask is provided with a light-blocking region that is formed in the regions corresponding to a gate electrode 104a, a gate line 102 connected the gate electrode 104a, a backlight shielding pattern 105 positioned at a circumference of the viewing angle control pixel, and a common pad lower electrode 112b, which will be formed later, and provided with a light-exposed region that is formed in a region other than the light-blocking region. Here, the light-blocking region and the light-exposed region may be formed in a reverse manner on the first mask, dependent on a kind of the first photosensitive film.

Next, the first conductive material layer is selectively removed by using the first photosensitive film pattern to form a gate electrode 104a, a gate line 102, a backlight shielding pattern 105, and a common pad lower electrode 112b, as illustrated in FIG. 4a, and then the first photosensitive film pattern is removed.

Figure 4B:
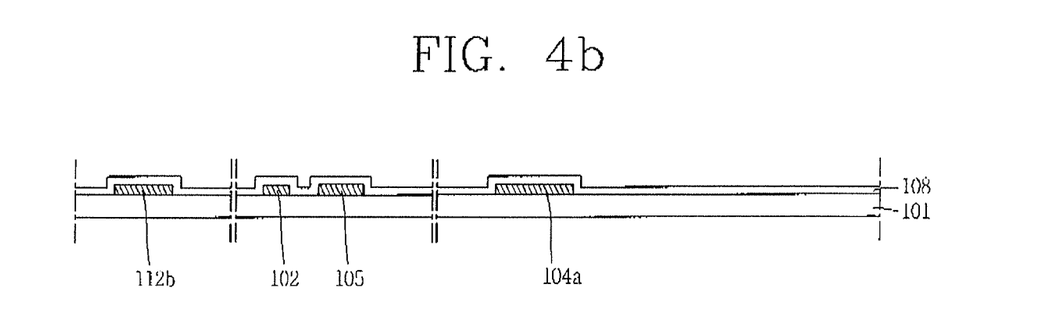

Subsequently, as illustrated in FIG. 4b, a gate insulation film 108 is formed on the first substrate 101 that is formed with the a gate electrode 104a, the gate line 102, the backlight shielding pattern 105, and the common pad lower electrode 112b.

Figure 4C:
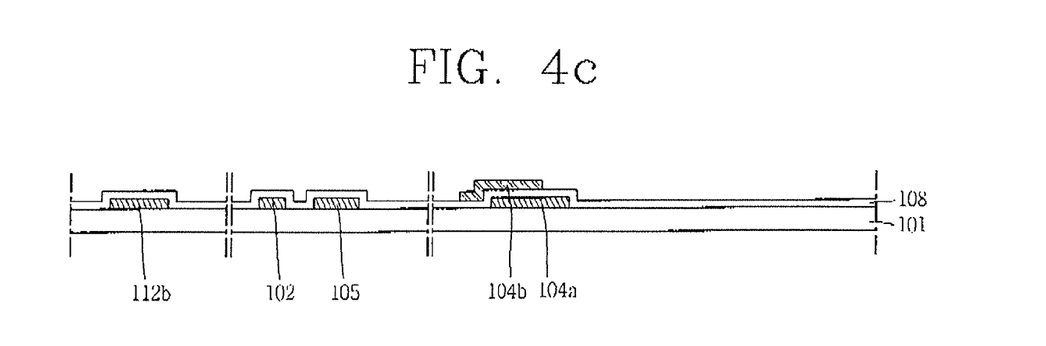

Subsequently, a second photosensitive film pattern is formed by sequentially forming a semiconductor material layer and a second photosensitive film on the first substrate 101, and then performing a photolithography process using a second mask.

The second mask is provided with a light-blocking region corresponding to a semiconductor layer 104b, which will be formed later, and provided with a light-exposed region that is formed in a region other than the light-blocking region.

Next, the semiconductor material layer is selectively removed by using the second photosensitive film pattern to form a semiconductor layer 104b as illustrated in FIG. 4c, and then the second photosensitive film pattern is removed.

Figure 4D:
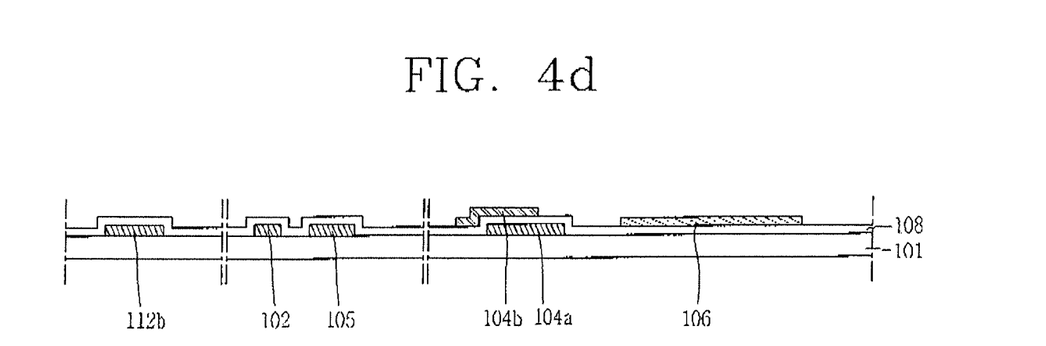

Subsequently, a third photosensitive film pattern is formed by sequentially forming a second conductive material layer and a third photosensitive film on the first substrate 101 formed with the semiconductor layer 104b, and then performing a photolithography process using a third mask. The second conductive material layer is preferably formed of a transparent conductive material, for example, Indium Tin Oxide (ITO).

The third mask is provided with a light-blocking region that is formed in a region corresponding to a first pixel electrode 106 and a second pixel electrode 107, which will be formed later, and provided with a light-exposed region that is formed in a region other than the light-blocking region.

Next, the second conductive material layer is selectively removed by using the third photosensitive film pattern to form a first pixel electrode 106 and a second pixel electrode 107 as illustrated in FIG. 4d and FIG. 3, and then the third photosensitive film pattern is removed.

Figure 4E:
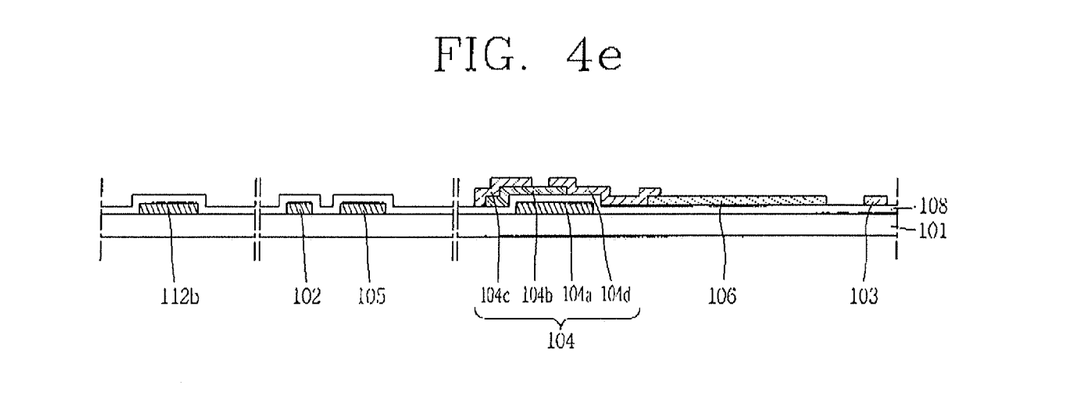

Subsequently, a fourth photosensitive film pattern is formed by sequentially forming a third conductive material layer and a fourth photosensitive film on the first substrate 101 formed with the first pixel electrode 106 and the second pixel electrode 107, and then performing a photolithography process using a fourth mask. The third conductive material layer is formed of aluminum (Al), aluminum alloy (Al alloy), copper (Cu), chromium (Cr), molybdenum (Mo), or the like.

The fourth mask is provided with a light-blocking region that is formed in a region corresponding to a source electrode 104c and a drain electrode 104d, which will be formed later, and provided with a light-exposed region that is formed in a region other than the light-blocking region.

Next, the third conductive material layer is selectively removed by using the fourth photosensitive film pattern to form a source electrode 104c and a drain electrode 104d as illustrated in FIG. 4e and FIG. 3, and then the fourth photosensitive film pattern is removed. At this time, the drain electrode 104d formed on the color display pixel is directly connected to the first pixel electrode 106 with no contact hole, and the drain electrode 104d formed on the viewing angle control pixel is directly connected to the second pixel electrode 107 with no contact hole.

Figure 4F:
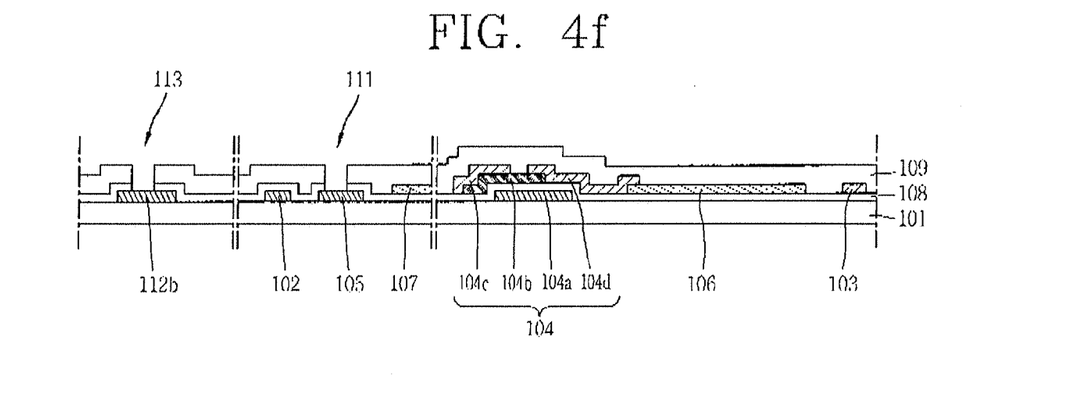

Subsequently, a protective film is formed on the first substrate 101 formed with the source electrode 104c and the drain electrode 104d.

Subsequently, a fifth photosensitive film pattern is formed by forming a fifth photosensitive film on the first substrate 101 formed with the protective film 109, and then performing a photolithography process using a fifth mask.

The fifth mask is provided with a light-blocking region that is formed in a region corresponding to a first contact hole 111 and a second contact hole 113, which will be formed later, and also provided with a light-exposed region that is formed in a region other than the light-blocking region. At this time, the first contact hole 111 exposes part of the backlight shielding pattern 105 formed in the viewing angle control pixel, and the second contact hole 113 exposes part of the common pad lower electrode 112b.

Next, the protective film 109 and the gate insulation film 108 are selectively removed by using the fifth photosensitive film pattern to form a first contact hole 111 and a second contact hole 113 as illustrated in FIG. 4f and FIG. 3, and then the fifth photosensitive film pattern is removed.

Figure 4G:
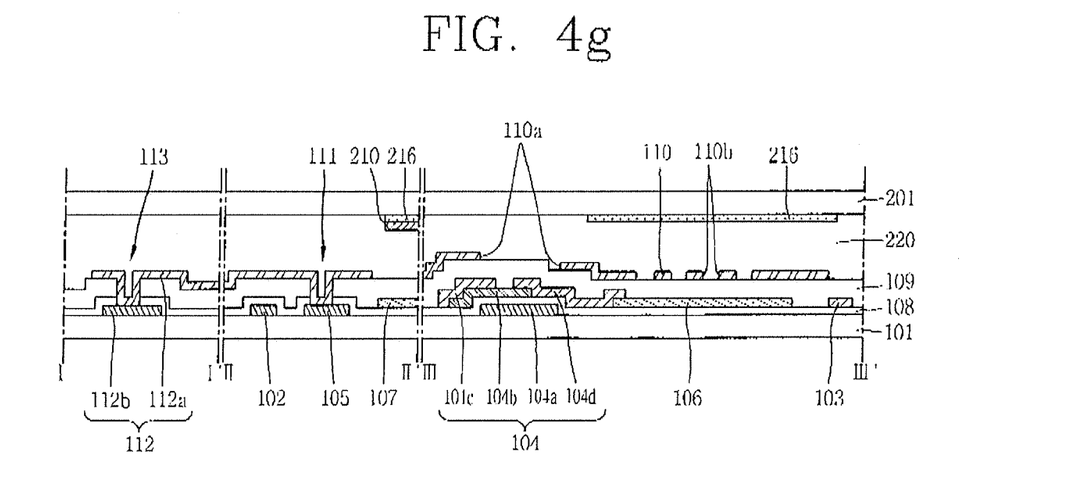

Subsequently, a sixth photosensitive film pattern is formed by sequentially forming a fourth conductive material layer and a sixth photosensitive film on the first substrate 101 formed with the first contact hole 111 and the second contact hole 113, and then performing a photolithography process using a sixth mask. The fourth conductive material layer is preferably formed of a transparent conductive material, for example, Indium Tin Oxide (ITO).

The sixth mask is provided with a light-blocking region that is formed in a region corresponding to a common pad upper electrode 112a and a first common electrode 110, which will be formed later, and provided with a light-exposed region that is formed in a region other than the light-blocking region.

Next, the fourth conductive material layer is selectively removed by using the sixth photosensitive film pattern to form a common pad upper electrode 112a and a first common electrode 110 as illustrated in FIG. 4g and FIG. 3, and then the sixth photosensitive film pattern is removed.

At this time, the first common electrode 110 is connected to the common pad lower electrode 112b through the second contact hole 113 formed at the protective film 109 and gate insulation film 108, and thereby the common pad upper electrode 112a and the common pad lower electrode 112b constitutes a common pad 112.

Furthermore, the first common electrode 110 is provided with a plurality of slits 110a, which are overlapped with the first pixel electrode 106 of the color display pixel and disposed in parallel with the data line 103, and the first common electrode 110 in cooperation with the first pixel electrode 106 formed on the color display pixel attached to itself forms a fringe field that is a parabolic-type transversal electric field, thereby driving a liquid crystal layer corresponding to the relevant color display pixel.

Furthermore, a hole 110b of the first common electrode 110 is formed on a region corresponding to a region on which a semiconductor layer 104b of the thin-film transistor 104 formed in the color display pixel is exposed between the source electrode 104c and the drain electrode 104d.

Moreover, the first common electrode 110 is formed to be overlapped with a region of the color display pixel excluding the hole 110b, and part of the backlight shielding pattern 105 of the viewing angle control pixel as well as part of the first pixel electrode 106, and the region overlapped with the backlight shielding pattern 105 is connected through the first contact hole 111 formed on the gate insulation film 108 and the protective film 109, thereby allowing the common electrode to apply even to the backlight shielding pattern 105.

Furthermore, the first common electrode 110 is formed to be overlapped with a region, which is not adjacent to the backlight shielding pattern 105 of the viewing angle control pixel on the data line 103, and as a result, the first common electrode 110 prevents the quality of the display from being degraded by distorting a driving waveform of the liquid crystal layer corresponding to the color display pixel by a pixel voltage transmitted through the data line 103.

The first substrate 101 fabricated through the aforementioned multiple processes is attached to a second substrate 201, i.e., a color filter substrate, having red, green, and blue color filters 216 for displaying colors, which are formed in the regions corresponding to the color display pixels, and the second common electrode 210 for forming a vertical electric field by corresponding to the second pixel electrode 107 of the first substrate 101, and then the liquid crystal layer 220 is formed between the first substrate 101 and the second substrate 201.

According to a liquid crystal display device having the foregoing configuration and a method of fabricating the same in accordance with a preferred embodiment of the present invention, electric fields are formed on a first common electrode 110 as well as a first pixel electrode 106 of the color display pixels to maximize the electric field forming region, thereby greatly enhancing the transmittance thereof when compared to the related art.

Furthermore, a liquid crystal display device according to a preferred embodiment of the present invention, a first contact hole 111 is formed only in each viewing angle control pixel but the contact hole is not formed at all in the color display pixels to minimize the ratio of contact holes occupied within the pixels, thereby enhancing the transmittance thereof.

As a result, the present invention may provides a liquid crystal display device capable of selectively driving a wide viewing angle or a narrow viewing angle, and at the same time, enhancing the display quality thereof.

Furthermore, a first contact hole 111 for connecting the first common electrode 110 of the first substrate 101 to the backlight shielding pattern 105 is formed at the same time during a process of forming a second contact hole 113 for connecting the common pad upper electrode 112a to the common pad lower electrode 112b. Accordingly, an additional process is not required in order to form the first contact hole 111 to connect the first common electrode 110 of the first substrate 101 to the backlight shielding pattern 105, thereby reducing the fabrication process time and effort.

The invention claimed is:

1. A liquid crystal display device, the device comprising:
   a first substrate and a second substrate;
   a gate line and a data line that intersect vertically and horizontally with each other on the first substrate for defining a plurality of color display pixels and a viewing angle control pixel;
   a thin-film transistor having a gate electrode, a source electrode, and a drain electrode, which is at each region intersected by the gate line and the data line on the first substrate;
   a backlight shielding pattern at a circumferential region of the viewing angle control pixel on the first substrate;
   a first pixel electrode connected to the drain electrode of the thin-film transistor, which is at the color display pixels on the first substrate;
   a second pixel electrode connected to the drain electrode of the thin-film transistor, which is at the viewing angle control pixel on the first substrate;
   a protective film on the gate line, the data line, the thin-film transistor, the first electrode, and the second pixel electrode, wherein a first contact hole exposes part of the backlight shielding pattern;
   a first common electrode connected to the backlight shielding pattern through the first contact hole of the protective film, which is overlapped with at least part of the first pixel electrode, part of the thin-film transistor, and part of the backlight shielding pattern, wherein a plurality of slits overlapped with the first pixel electrode are formed; and
   a second common electrode formed by corresponding to the first pixel electrode on the second substrate.

2. The liquid crystal display device of claim 1, wherein the first pixel electrode and the second pixel electrode are directly connected to the drain electrode of the thin-film transistor.

3. The liquid crystal display device of claim 1, wherein a gate insulation film is formed on the gate line and the gate electrode of the thin-film transistor, and the first contact hole is simultaneously formed at the gate insulation film and the protective film to expose part of the backlight shielding pattern region.

4. The liquid crystal display device of claim 1, wherein a common pad configured by comprising a common pad upper electrode connected to the first common electrode and a common pad lower electrode connected to the common pad upper electrode through a second contact hole formed on the protective film is additionally formed.

5. The liquid crystal display device of claim 4, wherein the a gate insulation film is on the gate line, the common pad lower electrode, and the gate electrode of the thin-film transistor, and the second contact hole is simultaneously formed on the insulation film and the protective film to expose part of the common pad lower electrode region.

6. The liquid crystal display device of claim 1, wherein a plurality of slits formed on the first common electrode are in parallel with the data line.

7. The liquid crystal display device of claim 1, wherein a hole of the first common electrode is on a region corresponding to at least part of the region on which a semiconductor layer of the thin-film transistor is formed on the color display pixels.

8. A method of fabricating a liquid crystal display device, the method comprising:
   preparing a first substrate on which a plurality of color display pixels and a viewing angle control pixel are defined;
   performing a photolithography process using a first mask to form a gate electrode, a gate line connected to the gate electrode, and a backlight shielding pattern positioned at a circumference of the viewing angle control pixel;
   forming a gate insulation film on the first substrate formed with the gate electrode and the gate line;
   performing a photolithography process using a second mask to form a semiconductor layer overlapped with part of the gate electrode on the gate insulation film;
   performing a photolithography process using a third mask to form a first pixel electrode of the color display pixels and a second pixel electrode of the viewing angle control pixel on the first substrate formed with the semiconductor layer;

performing a photolithography process using a fourth mask to form a source electrode and a drain electrode overlapped with part of the semiconductor layer on the first substrate formed with the first pixel electrode and the second pixel electrode;

forming a protective film on the first substrate formed with the source electrode and the drain electrode;

performing a photolithography process using a fifth mask to form a contact hole on the gate insulation film and the protective film for exposing part of the backlight shielding pattern of the viewing angle control pixel; and performing a photolithography process using a sixth mask to form a first common electrode, which is overlapped with at least part of the first pixel electrode, part of the thin-film transistor, and part of the backlight shielding pattern on the protective film formed with the first contact hole, and connected to the backlight shielding pattern through the first contact hole, and formed with a plurality of slits.

9. The method of fabricating a liquid crystal display device of claim 8, wherein the first pixel electrode and the second pixel electrode are directly connected to the drain electrode of the thin-film transistor.

10. The method of fabricating a liquid crystal display device of claim 8, wherein a common pad upper electrode connected to the first common electrode is additionally formed in the step of performing a photolithography process using the sixth mask to form the first common electrode, and a common pad lower electrode connected to the common pad upper electrode is additionally formed in the step of performing a photolithography process using the first mask to form the gate electrode, the gate line, and the backlight shielding pattern, and a common pad is provided with the common pad upper electrode and the common pad lower electrode.

11. The method of fabricating a liquid crystal display device of claim 10, a second contact hole for exposing part of the common pad lower electrode is additionally formed in the step of performing a photolithography process using the fifth mask to form the first contact hole.

12. The method of fabricating a liquid crystal display device of claim 8, wherein a plurality of slits formed on the first common electrode are formed in parallel with the data line.

13. The method of fabricating a liquid crystal display device of claim 8, wherein a hole of the first common electrode is formed on a region corresponding to at least part of the region on which a semiconductor layer of the thin-film transistor is formed on the color display pixels.

* * * * *